Oct. 25, 1960  J. B. KRIPKE  2,957,360
SPEED SELECTOR DEVICE
Filed July 18, 1958  3 Sheets-Sheet 1

INVENTOR.
Joseph B. Kripke
BY
R. L. Spencer
ATTORNEY

Oct. 25, 1960  J. B. KRIPKE  2,957,360
SPEED SELECTOR DEVICE
Filed July 18, 1958  3 Sheets-Sheet 2

INVENTOR.
Joseph B. Kripke
BY
ATTORNEY

Oct. 25, 1960 J. B. KRIPKE 2,957,360
SPEED SELECTOR DEVICE
Filed July 18, 1958 3 Sheets-Sheet 3

INVENTOR.
Joseph B. Kripke
BY
R. L. Spencer
ATTORNEY

United States Patent Office 2,957,360
Patented Oct. 25, 1960

2,957,360

SPEED SELECTOR DEVICE

Joseph B. Kripke, Milwaukee, Wis., assignor to General Motors Corporation, Detroit, Mich., a corporation of Delaware Filed July 18, 1958, Ser. No. 749,495

19 Claims. (Cl. 74—352)

This invention relates to a speed selecting device and more particularly to a power transmitting mechanism wherein a power input shaft may be selectively connected to a power output shaft in any one of a plurality of drive ratios. The power transmitting device is particularly adapted for use in mechanisms wherein space limitations are such as to require a speed changing device utilizing a minimum of space and one in which the speed of rotation of the driven shaft may be accurately controlled with respect to the speed of the driving shaft.

An object of this invention is to provide a speed changing device of a compact nature particularly adapted to meet stringent space requirements and yet be operable to provide rapid change of drive ratio.

Another object of this invention is to provide a speed changing device wherein a power input shaft may be moved transverse to the axis of rotation of a driven shaft to select the drive ratio desired.

An additional object of this invention is to provide a speed changing device incorporating a power motor and power input means having a plurality of power input members constructed and arranged such that the power motor and the plurality of power input members may be moved as a unit with respect to the axis of rotation of a power output member to selectively render any one of the power input members effective to drive the power output member.

A further object of this invention is to provide a speed changing device incorporating a mounting plate for supporting a motor and a plurality of motor driven drive members for driving a driven member wherein the mounting plate is movably supported upon a cam plate and wherein the mounting plate carries cam pins cooperating with cam surfaces on the cam plate to determine the position of the mounting plate with respect to the cam plate upon shifting from one drive ratio to another.

Another object of this invention is to provide a speed changing device incorporating a power motor and motor driven power input mechanism including a plurality of power input members all carried by a mounting plate supported for movement as a unit with respect to a fixed cam plate wherein the members driven by the motor extend through the cam plate into proximity of the driven member and wherein the mounting plate carries cam pins cooperating with cam grooves in the cam plate to secure the position of the mounting plate in selected positions upon movement of the mounting plate with respect to the cam plate to select a change of drive ratio.

These and other objects of this invention will be apparent from the following description and claims taken in conjunction with the accompanying drawings in which:

Figure 2:
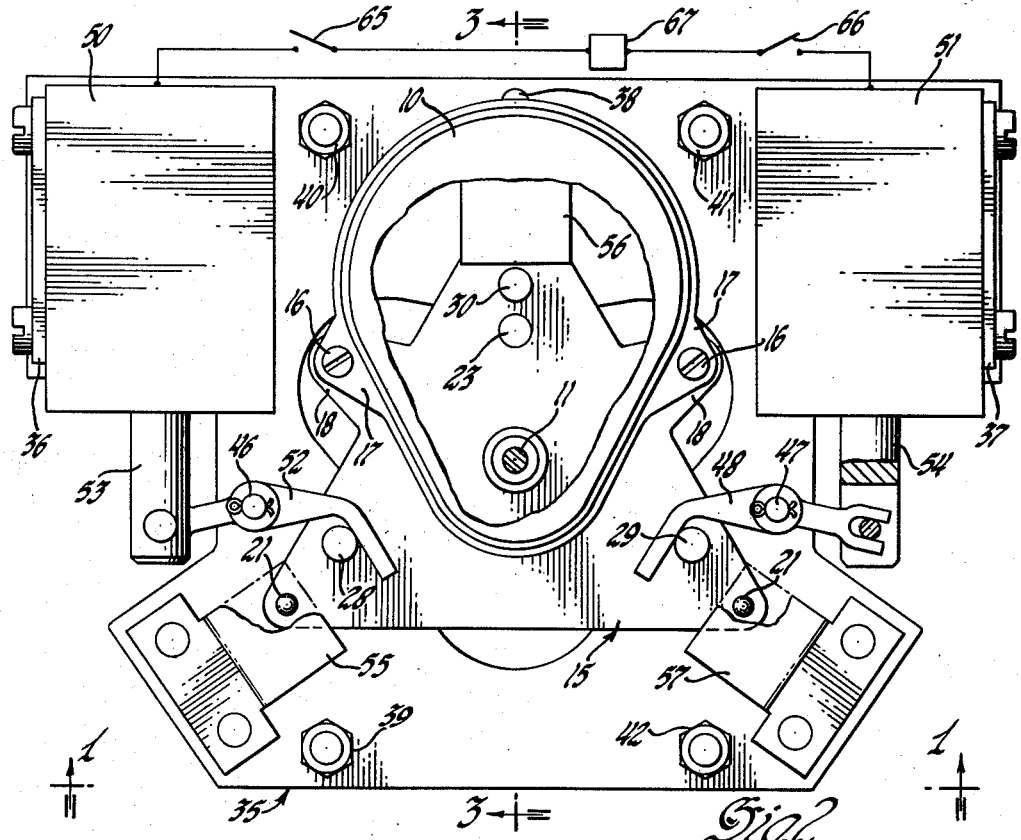
Figure 2 is a plan view of a speed changing device constructed in accordance with the principles of this invention.

Referring to the drawings, there is shown a speed selecting device embodying the principles of this invention having a drive motor 10 for driving a power input shaft 11 having a gear cluster including gears 12, 13 and 14 fixed thereto for rotation therewith. Motor 10 is mounted upon a mounting plate 15 by screws 16 extending through a flange 17 on motor 10 and terminating in spaced ears 18 of mounting plate 15, the ears 18 being threaded at 19 (see Figure 6) to receive screws 16. Each screw 16 extends through a spacer sleeve or washer, not shown, so that motor 10 is fixed to, but spaced from mounting plate 15 in assembled relationship.

Figure 3:
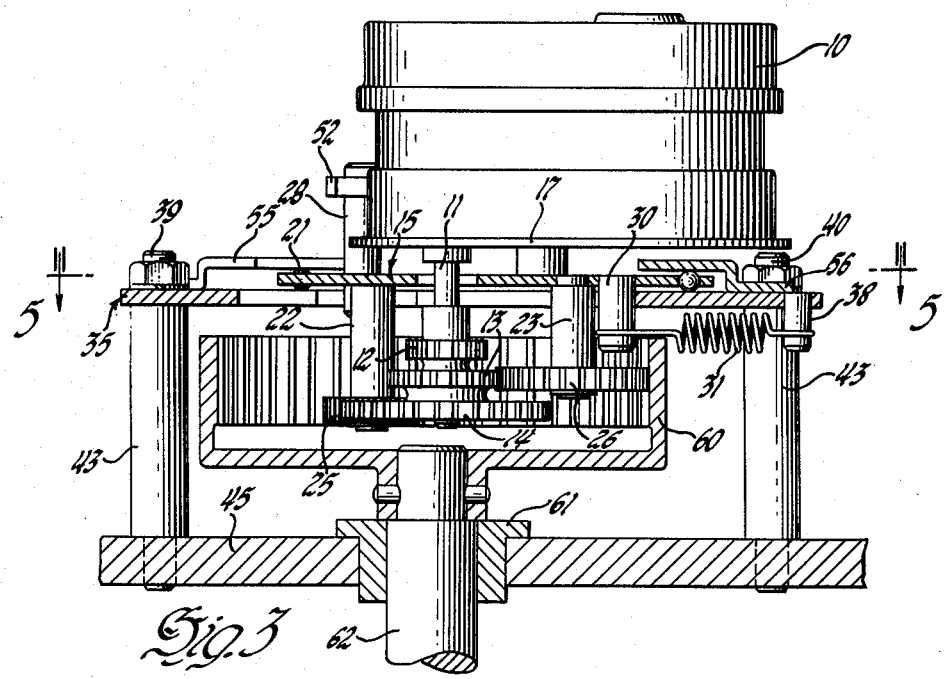
Figure 3 is a side view of the assembly.
Figure 4:
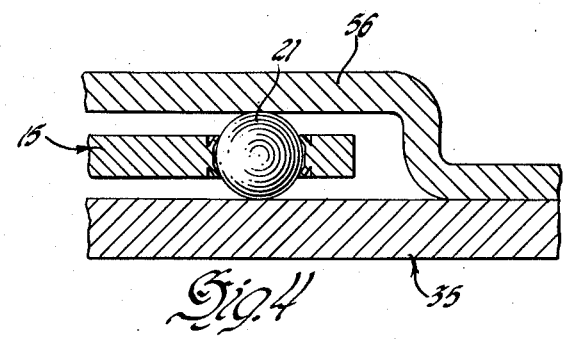
Figure 4 is an enlarged view illustrating one of the three ball rollers carried by the mounting plate.
Figures 5, 6:
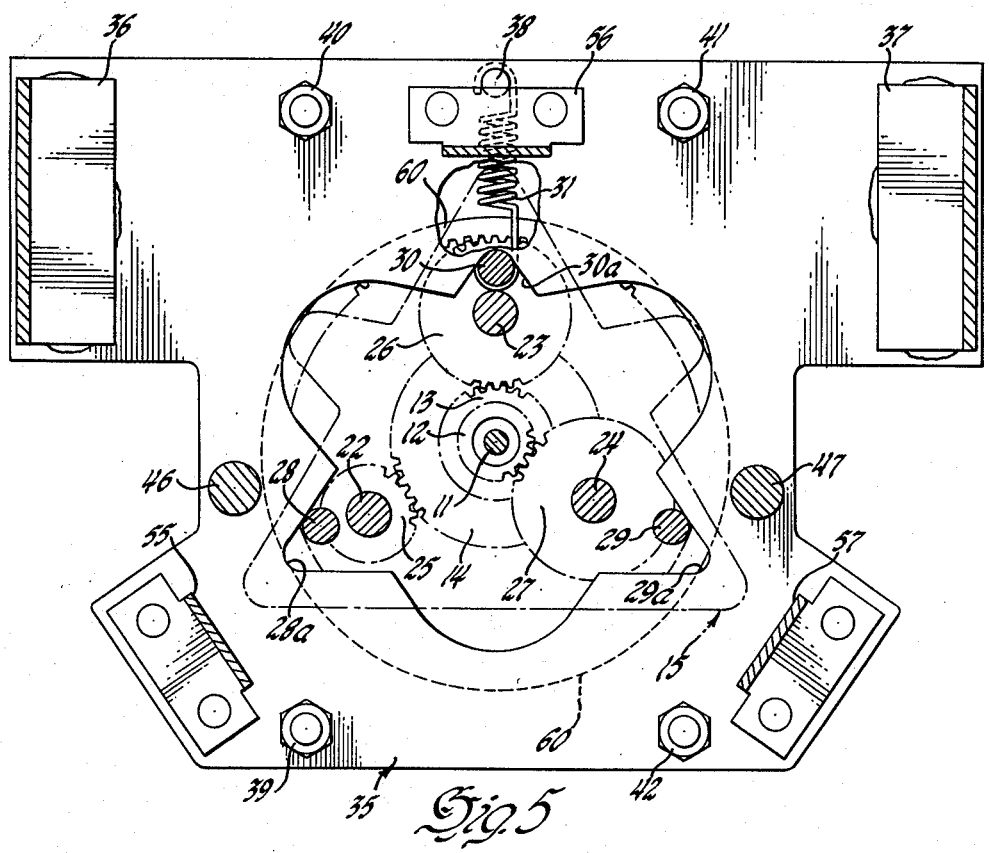
Figure 5 is a plan view illustrating the relationship of the cam plate and gearing when assembled.
Figure 6 is a perspective view of the mounting plate.

Details of mounting plate 15 can best be understood by referring to Figure 6. Plate 15 is of a generally triangular configuration and is provided with openings 20, one in each corner, each adapted to receive a ball roller 21 (see Figure 4). As shown in Figure 4, each opening 20 has the metal adjacent the opening struck up to stake ball in the opening after the ball is inserted therein. One ball 21 is thus loosely retained in each corner of plate 15. The diameter of each ball is greater than the thickness of plate 15. Further referring to Figure 6, plate 15 has shown secured thereto three gear mounting studs 22, 23 and 24. Stud 22 carries a gear 25, stud 23 supports a gear 26 and stud 24 supports a gear 27, the gears 25, 26 and 27 being shown in Figures 1, 3 and 5. The studs 22, 23 and 24 are of different length such that in the final assembly the gear 25 may be meshed with gear 14, gear 26 may be meshed with gear 13 and gear 27 may be meshed with gear 12. Mounting plate 15 also carries three cam pins 28, 29 and 30. Pins 28 and 29 each extend outwardly from plate 15 at opposite sides of the plate. Pin 30 extends outwardly from mounting plate 15 at the same side of the plate as the gear mounting studs. A spring 31, shown in Figures 3 and 5, is fixed to cam pin 30 for purposes hereafter more fully explained. An opening 32 is adapted to receive drive shaft 11 of motor 10.

In Figures 2 and 5 there is shown a cam plate 35 having mounting brackets 36 and 37 secured thereto at opposite sides of the plate and a pin 38 to which one end of spring 31 may be secured. Four mounting bolts 39, 40, 41 and 42 rigidly mount plate 35 upon a support member 45, as shown in Figure 3. A spacer sleeve 43 is disposed between plate 35 and support member 45 on each bolt to maintain the plate 35 a fixed distance from member 45 when assembled. A pair of spaced pivot studs 46 and 47 fixed to cam plate 35, extend upwardly from plate 35 for purposes hereafter more fully explained. The center portion of cam plate 35 is cut out to form cam surfaces to cooperate with pins 28, 29 and 30 of mounting plate 15. The cam surfaces are provided with V notches 28a, 29a, and 30a adapted to cooperate with cam pins 28, 29 and 30.

Figure 1:
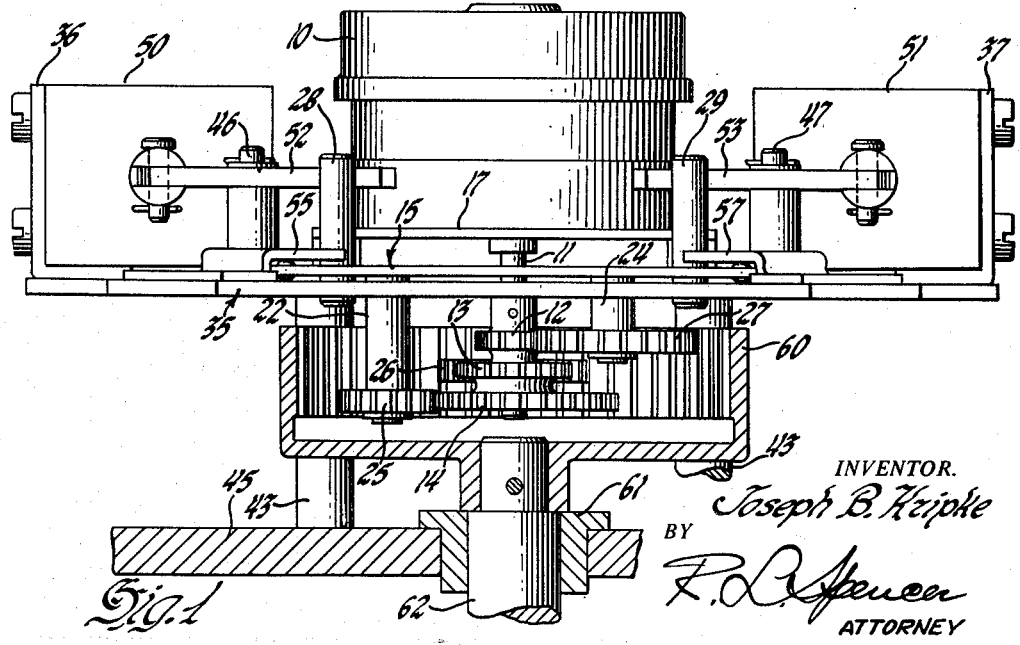
Figure 1 is a front view of the speed changing assembly.

Referring to Figures 1 and 2, there is shown a pair of solenoids 50 and 51 secured to brackets 36 and 37 respectively so as to be carried by cam plate 35. Stud 46 pivotally supports a bell crank lever 52, one end of which terminates in an extendible and retractable armature 53 of solenoid 50 and the other end of which overlies cam pin 28. Stud 47 pivotally supports a bell crank lever 48, one end of which terminates in an extendible and retractable armature 54 of solenoid 51 and the other end of which overlies cam pin 29. The juncture of armature 53 with bell crank lever 52 and that of armature 54 and bell crank lever 48 is such that movement of either armature will cause rotational movement of the bell crank lever actuated thereby to pivot about its support pin. Three hold down plates 55, 56 and 57 are fastened to cam plate 35, the hold down plates each, respectively, having a lip portion overlying mounting plate 15 in the area of one of the ball rollers carried by plate 15. The ball bearings 21 in each corner of mounting plate 15 support plate 15 on plate 35 so that the position of plate 15 on plate 35 may be changed as hereafter more fully explained.

As shown in Figures 1 and 3, an internal gear 60 fixed to a power delivery shaft 62 is supported for rotation in a bearing 61 carried by a support member 45. In the final assembly, the gear stud support shafts 22, 23 and 24 carrying gears 25, 26 and 27, respectively, extend downwardly through the opening 32 in the middle portion of cam plate 35 without contacting the cam surfaces, as does drive shaft 11. Cam pins 28, 29 and 30 fixed to mounting plate 15 each contact the cam surface of plate 35. The spring 31 fixed to pin 38 of cam plate 35 and to cam pin 30 carried by mounting plate 15 yieldably biases mounting plate 15 to a position wherein the gear 26 on stub shaft 23 meshes with large gear 60 to drive the gear 60. The pin 30 is pulled into a pin receiving groove 30a in cam plate 35 by spring 31, the groove 30a cooperating with the pin 30 to limit the range of motion of plate 15 with respect to plate 35 under action of spring 31. When pin 30 is disposed in notch 30a of plate 35, drive of shaft 62 is through gear 13, gear 26 and gear 60. This establishes intermediate speed drive of shaft 62. When pin 30 is in notch 30a, the stub shafts 22 and 24 are positioned such that pin 28 will be withdrawn from its pin receiving notch 28a in cam plate 35 and pin 29 will be withdrawn from its pin receiving notch 29a in cam plate 35. The gears 25 and 27 will be out of engagement with internal gear 60. It will be apparent therefore, that when neither solenoid 50 nor 51 is energized, spring 31 yieldably biases mounting plate 15 to mesh gear 26 with gear 60 to establish intermediate drive ratio through gears 13, 26 and 60.

To establish a relatively fast drive of shaft 62 with respect to the speed of rotation of motor driven shaft 11, solenoid 50 may be energized to cause armature 53 to be withdrawn into the solenoid. Such action will cause bell crank lever 52 to pivot in a clockwise rotation about pivot post 46 thereby forcing cam pin 28 into V notch 28a in cam plate 35. Cam pin 30 will be pulled out of cam notch 30a and cam pin 29 will be pulled out of notch 29a. Gear 25 will mesh with gear 60 and gears 26 and 27 will be out of mesh with gear 60. Drive will be through gear 14, gear 25 and gear 60.

For relatively slow drive of shaft 62, solenoid 51 may be energized to withdraw armature 54 into the solenoid. This will cause bell crank lever 48 two rotate counterclockwise about pin 47 to force cam pin 29 into cam notch 29a. Cam pin 28 will be withdrawn from cam notch 28a and cam pin 30 will be withdrawn from cam notch 30a. Gear 27 will be placed in mesh with gear 60 and gears 25 and 26 out of mesh with gear 60. Drive of shaft 62 will be by way of gear 12, gear 27 and gear 60.

The speed change device is utilized in slowly rotating mechanism so that the intermittent engagement and release of gears 25, 26 and 27 with gear 60 presents no problem of tooth breakage or clash. It will be apparent that the gears of the gear cluster are each of different diameter, the gear 12 being the smallest, the gear 13 being larger than gear 12 and the gear 14 being the largest. The gear 25 meshing with 14 is smaller than gears 26 and 27, gear 26 meshing with gear 13 is larger than gear 25 but smaller than gear 27, and gear 27 meshing with gear 12 is of greater diameter than either gear 26 or 25. In the particular application of the device, the number of teeth on the various gears is as follows: gear 12, twelve teeth; gear 27, twenty-seven teeth; gear 13, eighteen teeth; gear 26, twenty-four teeth; gear 14, thirty-six teeth; and gear 25, fifteen teeth. Gear 60 is provided with 72 teeth. With the above gear tooth arrangement, assuming a constant speed of rotation of motor 10 at four revolutions per hour, the low speed drive of shaft 62 will be ⅔ of a revolution per hour; intermediate speed drive of shaft 62 will be one revolution per hour and high speed drive of shaft 62 will be two revolutions per hour.

It will also be apparent that the arrangement is very compact, utilizing minimum space and is particularly adapted for use in installations having stringent space requirements. The positioning of the motor 10 on one side of the mounting and cam plates 15 and 35 and the various drive gears on the other side of the plates and within internal gear 60 provides an assembly which is compact and simple in arrangement. The range of lateral motion of the mounting plate 15 with respect to the axis of rotation of shaft 22 to change drive ratio is slight, further contributing to the provision of an assembly having minimum space requirements and yet capable of providing quick and positive change of drive ratio.

A switch 65 connected to an electrical source 67 may be closed to energize solenoid 50 and a switch 66 connected to source 67 may be closed to energize solenoid 51.

I claim:

1. A speed selecting device for drivingly connecting a drive shaft to a driven shaft in any one of a plurality of drive ratios including a plurality of drive members driven by said drive shaft, said drive members comprising a gear cluster fixed to said drive shaft and a plurality of spaced idler gears driven by said gear cluster and adapted to be selectively connected in driving relationship to said driven shaft, said drive shaft and drive members being movable as a unit to selectively render said drive members effective to drive said driven shaft, means yieldably biasing said drive shaft to a position to establish drive of said driven shaft through one of said drive members, selectively operable means for positioning said drive shaft to establish drive of said driven shaft through a second of said drive members, and additional selectively operable means for positioning said drive shaft to establish drive of said driven shaft through a third of said drive members.

2. A speed selecting device for drivingly connecting a drive shaft to a driven shaft in any one of a plurality of drive ratios including a first plate movable with respect to a second plate, said drive shaft extending through both of said plates and driving a plurality of drive members, said drive members comprising a gear cluster fixed to said drive shaft and an idler gear in mesh with each gear of said gear cluster, means yieldably biasing said first plate with respect to the position of said second plate and said driven shaft to establish drive of said driven shaft through one drive ratio, and selectively operable mechanism including means carried by said second plate operable upon said first plate for positioning said first plate and said drive shaft to establish drive of said driven shaft in a different drive ratio through a second of said drive members.

3. A speed selecting device for drivingly connecting a drive shaft to a driven shaft in any one of a plurality of drive ratios including a first plate mounted upon a second plate and movable with respect to said second plate, a plurality of drive members driven by said drive shaft including a gear cluster fixed to said drive shaft and a plurality of spaced idler gears driven by said gear cluster and adapted to be selectively connected in driving relationship to said driven shaft, spring means yieldably positioning said first plate on said second plate to establish drive of said driven shaft in one drive ratio through one of said drive members, and means carried by said second plate operable upon said first plate for positioning said first plate with respect to said second plate to establish drive of said driven shaft in a second drive ratio through a second of said drive members.

4. A speed selecting device for drivingly connecting a drive shaft to a driven shaft in any one of a plurality of drive ratios including a motor for driving said drive shaft mounted upon a first plate, a plurality of drive members fixed to said drive shaft for rotation therewith, a plurality of idler gears driven by said drive members, a power receiving member carried by said driven shaft and adapted to be selectively driven by different ones of said plurality of idler gears, means movably mounting said first plate upon a second plate, said first plate, motor, drive shaft, and said plurality of drive members and idler gears being movable as a unit with respect to said second plate, said power receiving member, and said driven shaft, to establish drive of said driven shaft in different drive ratios, means yieldably biasing said first plate to establish drive of said driven shaft in one drive ratio through one of said idler gears, and selectively operable means for positioning said first plate in a second position on said second plate to establish drive of said driven member in a second drive ratio through a second of said idler gears.

5. A speed selecting device for drivingly connecting a motor driven drive shaft to a power delivery shaft in any one of a plurality of drive ratios including a mounting plate for supporting said motor and said drive shaft, a plurality of drive members fixed to said drive shaft for rotation therewith, a plurality of spaced studs carried by said mounting plate and supporting a plurality of idler gears thereon, each of said idler gears being driven by one of said drive members, a power receiving member fixed to said driven shaft for rotation therewith, and adapted to be selectively driven by different ones of said plurality of idler gears, means mounting said first-mentioned plate upon a second plate in movable relationship to said second plate, means for positioning said first-mentioned plate with respect to said second plate to establish drive of said power receiving member in one drive ratio through one of said plurality of idler gears, selectively operable means for positioning said first-mentioned plate on said second plate to establish drive of said power receiving member in a second drive ratio through a second of said plurality of idler gears, and selectively operable means for positioning said first-mentioned plate upon said second plate to establish drive of said power receiving member in a third drive ratio through a third of said plurality of idler gears.

6. A speed selecting device for drivingly connecting a drive shaft to a driven shaft in any one of a plurality of drive ratios including a first plate movably supported upon a second plate, said drive shaft being mounted upon said first plate for movement with respect to said second plate and a drive receiving member carried by said driven shaft, a plurality of drive members carried by said first plate and driven by said drive shaft, said drive members including a gear cluster driven by said drive shaft and a plurality of spaced idler gears in mesh with said gear cluster, cam members fixed to said first plate, cam surfaces in said second plate for receiving said cam members, means for positioning said first plate upon said second plate such that one of said cams cooperates with one of said cam surfaces to permit drive of said power receiving member in one drive ratio through one of said plurality of idler gears, and selectively operable means for positioning said first plate with respect to said second plate such that a second of said cam members cooperates with a second of said cam surfaces to permit drive of said power receiving member in a different drive ratio through a second of said plurality of idler gears.

7. A speed selecting device for drivingly connecting a drive shaft to a driven shaft in any one of a plurality of drive ratios including a first plate movably supported upon a second plate, said drive shaft being mounted upon said first plate for movement with respect to a drive receiving member fixed to said driven shaft, a plurality of drive members driven by said drive shaft and supported upon said first plate, said drive members including a gear cluster on said drive shaft and a plurality of idler gears in mesh with said gear cluster, a plurality of cam pins fixed to said first plate, a cam surface on said second plate having a plurality of spaced notches each adapted to receive one of said cam pins, means operable to position one of said cam pins in one of said notches to establish drive of said power receiving member in one drive ratio through one of said plurality of idler gears, and selectively operable means for positioning a second of said cam pins in a second of said notches to establish drive of said power receiving member in a second drive ratio through a second of said plurality of idler gears.

8. A speed selecting device for drivingly connecting a drive shaft to a driven shaft in any one of a plurality of drive ratios including a first plate movably supported upon a second plate, said drive shaft being mounted upon said first plate for movement with respect to a drive receiving member fixed for rotation with said driven shaft, a plurality of drive members driven by said drive shaft and supported upon said first plate, said drive members including a gear cluster and a plurality of idler gears in mesh with said gear cluster first, second and third cam pins fixed to said first plate, a cam surface on said second plate having first, second and third recesses formed thereon, means operable to position said first cam pin in said first recess to establish drive of said power receiving member in one drive ratio through one of said plurality of idler gears, selectively operable means for positioning said second cam pin in said second recess to establish drive of said power receiving member in a second drive ratio through a second of said plurality of idler gears, and selectively operable means for positioning said third cam pin in said third recess to establish drive of said power receiving member in a third drive ratio through a third of said plurality of idler gears.

9. A speed selecting device for drivingly connecting a drive shaft to a driven shaft in any one of a plurality of drive ratios including a first plate movably supported upon a second plate, said drive shaft being mounted upon said first plate for movement with respect to a drive receiving member fixed for rotation with a driven shaft, a plurality of drive members driven by said drive shaft and supported upon said first plate, said drive members including a gear cluster fixed to said drive shaft and a plurality of idler gears driven by said gear cluster, a cam surface on said second plate having a plurality of spaced recesses formed thereon, a plurality of spaced cam pins carried by said first plate and adapted to cooperate with said cam surface, means yieldably biasing said first plate to dispose one of said cam pins in one of said recesses to establish drive of said power receiving member in one drive ratio through one of said plurality of idler gears, and selectively operable means mounted upon said second plate and operative upon a second of said cam pins for moving said last-mentioned cam pin into a second of said plurality of recesses to establish drive of said power receiving member in a second drive ratio through a second of said plurality of idler gears.

10. A speed selecting device for drivingly connecting a drive shaft to a driven shaft in any one of a plurality of drive ratios including a first plate movably supported upon a second plate, said drive shaft being mounted upon said first plate for movement with respect to a drive receiving member fixed for rotation with a driven shaft, a plurality of drive members driven by said drive shaft and supported upon said first plate, said drive members including a gear cluster fixed to said drive shaft and a plurality of idler gears in mesh with said gear cluster, a cam surface on said second plate having a plurality of spaced recesses formed thereon, a plurality of spaced cam pins fixed to said first plate and adapted to cooperate with said cam surface, means yieldably biasing said first plate to dispose one of said cam pins in one of said recesses to establish drive of said power receiving member in one drive ratio through one of said plurality of idler gears, selectively operable means mounted upon said second plate and operative upon a second of said plurality of cam pins for moving said second cam pin into a second of said plurality of recesses to establish drive of said power receiving member in a second drive ratio through a second of said plurality of idler gears, and additional selectively operable means mounted upon said second plate and operative upon a third of said cam pins for moving said third cam pin into a third of said recesses for establishing drive of said power receiving member in a third drive ratio through a third of said plurality of idler gears.

11. A speed selecting device for drivingly connecting a drive shaft to a driven shaft in any one of a plurality of drive ratios including a first plate movably supported upon a second plate, said drive shaft being mounted upon said first plate for movement with respect to a drive receiving member fixed to a driven shaft, a plurality of drive members driven by said drive shaft and supported upon said first plate, said drive members including a gear cluster fixed to said drive shaft and a plurality of idler gears driven by said gear cluster, a cam surface on said second plate having a plurality of spaced recesses thereon, a plurality of cam pins carried by said first plate and cooperating with said cam surface, means yieldably biasing said first plate to dispose one of said cam pins in one of said recesses to establish drive of said power receiving member in one drive ratio through one of said idler gears, a bell crank lever pivotally mounted upon said second plate and operatively contacting a second of said cam pins, and selectively operable means for moving said bell crank lever to dispose said second cam pin in a second recess in said cam surface to establish drive of said drive receiving member in a second drive ratio through a second of said idler gears.

12. A speed selecting device for drivingly connecting a drive shaft to a driven shaft in any one of a plurality of drive ratios including a first plate movably supported upon a second plate, said drive shaft being mounted upon said first plate for movement with said first plate with respect to a drive receiving member fixed to said driven shaft, a plurality of drive members driven by said drive shaft and rotatably supported upon said first plate, said drive members including a gear cluster fixed to said drive shaft and a plurality of idler gears driven by said gear cluster, a cam surface on said second plate having a plurality of spaced recesses thereon, a plurality of spaced cam pins carried by said first plate and cooperating with said cam surface, means yieldably biasing said first plate to dispose one of said cam pins in one of said recesses to establish drive of said power receiving member through one of said idler gears, a bell crank lever pivotally mounted on said second plate and operatively contacting a second of said cam pins, and a selectively operable solenoid fixed to said second plate effective when energized to move said bell crank lever to position a second cam pin in a second of said recesses in said cam surface to establish drive of said drive receiving member in a second drive ratio through a second of said idler gears.

13. A speed selecting device for drivingly connecting a drive shaft to a driven shaft in any one of a plurality of drive ratios including a first plate movably supported upon a second plate, a drive receiving member mounted in fixed relation to said second plate and fixed to said driven shaft, a plurality of drive transmitting members carried by said first plate and driven by said drive shaft, said drive transmitting members including a gear cluster fixed to said drive shaft and a plurality of idler gears driven by said gear cluster, a cam surface formed on said second plate having a plurality of spaced recesses thereon, a plurality of spaced cam pins fixed to said first plate and cooperating with said cam surface, spring means yieldably biasing one of said cam pins to dispose said cam pin in one of said recesses to establish drive of said drive receiving member in one drive ratio through one of said idler gears, a first bell crank lever pivotally mounted on said second plate and in operative relation to a second of said cam pins, a first solenoid carried by said second plate in operative relation with said first bell crank lever and effective when energized to rotate said bell crank lever to position said second cam pin in a second of said recesses to establish drive of said drive receiving member in a second drive ratio through a second of said idler gears, a second bell crank lever pivotally mounted on said second plate in operative relation to a third of said cam pins, a second solenoid carried by said second plate in operative relation with said second bell crank lever and effective when energized to rotate said bell crank lever to position said third cam pin in a third of said recesses to establish drive of said drive receiving member in a third drive ratio through a third of said idler gears.

14. A speed selecting device for drivingly connecting a drive shaft to a driven shaft in any one of a plurality of drive ratios including a first plate supported upon and movable with respect to a second plate, a motor for driving said drive shaft supported upon said first plate, a gear cluster fixed to said drive shaft, an internal gear fixed to said driven shaft, a plurality of drive transmitting gears in mesh with said gear cluster supported upon said first plate, a cam track formed on said second plate provided with spaced recesses thereon, a plurality of cam pins fixed to said first plate and cooperating with said cam track, means yieldably biasing said first plate to position one of said cam pins in one of said recesses to establish drive of said internal gear through one of said drive transmitting gears in one drive ratio, and selectively operable means for positioning a second of said cam pins in a second of said recesses to establish drive of said internal gear in a second drive ratio through a second of said drive transmitting gears.

15. A speed selecting device for drivingly connecting a drive shaft to a driven shaft in any one of a plurality of drive ratios including a first plate and a second plate, means for movably supporting said first plate on said second plate including a plurality of spaced rollers carried by said first plate and a plurality of hold down plates fixed to said second plate, said rollers being disposed between said second plate and said hold down plates, a motor for driving said drive shaft supported upon said first plate, a gear cluster driven by said drive shaft, a plurality of drive transmitting gears mounted upon said first plate and in mesh with said gear cluster, an internal gear fixed to said driven shaft, a cam track on said second plate having a plurality of spaced recesses formed thereon, a plurality of cam pins fixed to said first plate and cooperating with said cam track, means for positioning one of said cam pins in one of said recesses to establish drive of said internal gear in one drive ratio through one of said drive transmitting gears, and means for positioning a second of said cam pins in a second of said recesses to establish drive of said internal gear in a second drive ratio through a second of said drive transmitting gears.

16. A drive mechanism for selectively driving a driven shaft at different speed ratios comprising in combination a support member supporting said driven shaft for rotation therein, a ring gear fixed for rotation with said driven shaft, a cam plate mounted in fixed relationship with respect to said ring gear, a series of spaced notches on said cam plate each adapted to receive a cam pin therein, a mounting plate supported upon said cam plate and movable with respect to said cam plate, a series of cam pins carried by said cam plate, each of said cam pins being disposed in one of said notches, a plurality of spaced idler gears supported on said mounting plate, a power input shaft supported upon said mounting plate, a gear cluster driven by said power input shaft, each of the gears of said gear cluster being in mesh, respectively, with one of said idler gears, and means for moving said mounting plate with respect to said cam plate to selectively engage said idler gears to said ring gear.

17. A speed selecting drive device for drivingly connecting a drive shaft to a driven shaft in any one of a plurality of drive ratios comprising in combination a main support member supporting said driven shaft for rotation therein, a ring gear fixed to said driven shaft for rotation therewith, a cam plate supported upon said main support member and spaced therefrom, said cam plate being formed to provide a series of spaced cam notches each adapted to receive a cam pin therein, a mounting plate supported upon said cam plate for movement with respect to said cam plate, a power driven power input shaft supported upon said mounting plate for movement therewith, a gear cluster driven by said power input shaft, a series of spaced idler gears supported upon said mounting plate for unitary movement with said plate, each of said idler gears, respectively, being in mesh with one of said gears of said gear cluster, a plurality of spaced cam pins fixed to said mounting plate, and means for selectively positioning said cam pins, respectively in the base of said cam notches to selectively engage said idler gears to said ring gear to change the speed of rotation of said driven shaft with respect to the speed of rotation of said drive shaft.

18. A drive mechanism for selectively driving a driven shaft at different speed ratios comprising in combination a support member supporting said driven shaft for rotation therein, a ring gear fixed to said driven shaft for rotation therewith, a cam plate mounted in fixed relationship with respect to said ring gear, a series of spaced notches on said cam plate each adapted to receive a cam pin therein, a mounting plate supported for free motion with respect to said cam plate, a series of spaced cam pins carried by said cam plate, each one of said cam pins, respectively, being disposed in a different one of said notches to limit the range of motion of said mounting plate with respect to said cam plate, a series of spaced studs carried by said mounting plate, an idler gear rotatably mounted on each one of said studs, a driving shaft supported on said mounting plate, a gear cluster driven by said driving shaft, each of said idler gears being in mesh with a different gear of said gear cluster, and means for moving said mounting plate to different positions with respect to said cam plate to selectively engage said idler gears to said ring gear to change the speed of rotation of said driven shaft with respect to the speed of rotation of said driving shaft.

19. A drive mechanism for selectively driving a driven shaft at different speed ratios comprising in combination, a support member supporting said driven shaft for rotation therein, a ring gear fixed to said driven shaft for rotation therewith, a cam plate mounted in fixed relation with respect to said ring gear and spaced therefrom, an opening through said cam plate and shaped to provide a series of spaced notches each adapted to receive a cam pin therein, a mounting plate supported upon said cam plate and freely movable with respect to said cam plate, a series of spaced cam pins carried by said mounting plate, each one of said cam pins, respectively, being disposed in a different one of said notches to limit the range of motion of said mounting plate with respect to said cam plate, a motor mounted on said mounting plate and driving a drive shaft, a gear cluster fixed to said drive shaft for rotation therewith, a series of spaced studs supported upon said mounting plate, an idler gear supported for rotation upon each of said studs, respectively, each one of said idler gears being in mesh, respectively, with a different one of the gears of said gear cluster, and selectively operable means associated with said cam pins for selectively positioning said cam pins in said cam notches to selectively engage said idler gears to said ring gear to control the speed of rotation of said driven shaft with respect to the speed of rotation of said drive shaft.

References Cited in the file of this patent

UNITED STATES PATENTS

| | | |
|---|---|---|
| 1,192,491 | Becker | July 25, 1916 |
| 1,238,623 | Bandiera | Aug. 28, 1917 |
| 1,442,217 | H'Doubler | Jan. 16, 1923 |
| 2,478,674 | Symmes | Aug. 9, 1949 |

FOREIGN PATENTS

| | | |
|---|---|---|
| 4,873 | Great Britain | 1880 |